US011947740B2

(12) United States Patent
Wu

(10) Patent No.: US 11,947,740 B2
(45) Date of Patent: Apr. 2, 2024

(54) 6DOF POSITIONING TRACKING DEVICE AND METHOD, AND ELECTRONIC APPARATUS

(71) Applicant: QINGDAO PICO TECHNOLOGY CO., LTD., Shandong (CN)

(72) Inventor: Tao Wu, Shandong (CN)

(73) Assignee: QINGDAO PICO TECHNOLOGY CO., LTD. (CN)

( * ) Notice: Subject to any disclaimer, the term of this patent is extended or adjusted under 35 U.S.C. 154(b) by 0 days.

(21) Appl. No.: 17/869,913

(22) Filed: Jul. 21, 2022

(65) Prior Publication Data
US 2022/0391026 A1    Dec. 8, 2022

Related U.S. Application Data

(63) Continuation of application No. PCT/CN2021/120783, filed on Sep. 26, 2021.

(30) Foreign Application Priority Data

Jun. 2, 2021 (CN) .......................... 202110615274.1

(51) Int. Cl.
*G06F 3/0346* (2013.01)
*G01C 21/16* (2006.01)
(Continued)

(52) U.S. Cl.
CPC ....... *G06F 3/0346* (2013.01); *G01C 21/1656* (2020.08); *G06T 7/248* (2017.01);
(Continued)

(58) Field of Classification Search
CPC ......... G06F 3/0346; G06T 7/292; G06T 7/74; G06T 7/248; G01C 21/1656; H04N 23/90
See application file for complete search history.

(56) References Cited

U.S. PATENT DOCUMENTS 8,761,439 B1    6/2014 Kumar et al.
10,664,993 B1   5/2020 Reddy et al.
(Continued)

FOREIGN PATENT DOCUMENTS

CN    111427452 A    7/2020
CN    112416125 A    2/2021
(Continued)

OTHER PUBLICATIONS

First Office Action dated Mar. 7, 2023 in Chinese Application No. 202110615274.1, with English translation (19 pages).

*Primary Examiner* — Afroza Chowdhury

(57) ABSTRACT

A six degrees of freedom (6 DoF) positioning tracking device and method, and an electronic apparatus are provided. The device includes at least three tracking cameras, an inertial navigation unit and a computation processing unit, where the at least three tracking cameras are distributed at preset angles and are configured to obtain image data in a current environment and transmit the image data to the computation processing unit; the inertial navigation unit is configured to obtain state information of the 6 DoF positioning tracking device in the current environment and transmit the state information to the computation processing unit; and the computation processing unit is configured to determine 6 DoF data of the 6 DoF positioning tracking device relative to the current environment according to the image data and the state information.

19 Claims, 2 Drawing Sheets

(51) Int. Cl.
  *G06T 7/246* (2017.01)
  *G06T 7/292* (2017.01)
  *G06T 7/73* (2017.01)
  *H04N 23/90* (2023.01)

(52) U.S. Cl.
  CPC ............. *G06T 7/292* (2017.01); *G06T 7/74* (2017.01); *H04N 23/90* (2023.01)

(56) References Cited

U.S. PATENT DOCUMENTS

| | | | | |
|---|---|---|---|---|
| 10,750,156 | B2* | 8/2020 | Volochniuk | H04N 23/698 |
| 10,902,627 | B2* | 1/2021 | Guignard | G06V 20/20 |
| 2002/0167726 | A1* | 11/2002 | Barman | H04N 13/239 |
| | | | | 348/E13.016 |
| 2003/0186563 | A1* | 10/2003 | Kobayashi | H01L 21/324 |
| | | | | 438/795 |
| 2016/0071272 | A1* | 3/2016 | Gordon | G01B 21/042 |
| | | | | 348/48 |
| 2017/0045814 | A1* | 2/2017 | Geerds | H04N 23/698 |
| 2018/0132116 | A1* | 5/2018 | Shekhar | H01Q 3/38 |
| 2018/0217663 | A1 | 8/2018 | Chandrasekhar et al. | |
| 2018/0340804 | A1* | 11/2018 | Cherkashin | G01D 5/12 |
| 2020/0064119 | A1* | 2/2020 | Gordon | G06T 7/73 |
| 2020/0175712 | A1 | 6/2020 | Guignard | |
| 2021/0124412 | A1* | 4/2021 | Johnson | G08B 21/02 |
| 2021/0156881 | A1* | 5/2021 | Zweigle | G01P 3/38 |
| 2021/0158561 | A1* | 5/2021 | Park | G06T 15/20 |
| 2022/0295038 | A1* | 9/2022 | Venkataraman | G02B 30/25 |

FOREIGN PATENT DOCUMENTS

| | | |
|---|---|---|
| CN | 112527102 A | 3/2021 |
| EP | 3 252 714 A1 | 12/2017 |

\* cited by examiner

6DOF POSITIONING TRACKING DEVICE AND METHOD, AND ELECTRONIC APPARATUS

CROSS REFERENCE

This application is a continuation of PCT International Application No. PCT/CN2021/120783 filed on Sep. 26, 2021, which claims priority to Chinese Application No. 202110615274.1 filed with China National Intellectual Property Administration on Jun. 2, 2021, the entirety of which is herein incorporated by reference.

TECHNICAL FIELD

The present disclosure relates to the technical field of virtual reality (VR)/augmented reality (AR), and particularly relates to a six degrees of freedom (6 DoF) positioning tracking device and method, and an electronic apparatus.

BACKGROUND

In a user scenario, particularly in a business scenario, of the AR/VR field, exciting and immersing games are developed to make the user more excited and immersed in VR/mixed reality (MR). For example, in a multi-user gunshot game, a toy gun held by the user is used for simulating a real gun in a virtual scenario. Moreover, in some training scenarios, such as a fire drill in a VR/MR mode, with a real object simulating a real fire extinguisher, the fire drill is performed by operating the object simulating the real fire extinguisher in physical reality and a VR/MR head-mounted integrated machine.

In the above scenarios, the user operates a simulation object to experience mixed virtuality and reality. In order to achieve the purpose, it is customary to fix a gamepad controller on a simulation object, so as to endow the simulation object with a six degrees of freedom (6 DoF) tracking function. However, due to some limitations of the gamepad controller, the actual user experience is not good enough, for example, the size of the gamepad cannot match the simulation object properly. In addition, the actual user experience is influenced due to the limitation of some sensors of the gamepad, for example, a gamepad controller adopting an electromagnetic solution is easily influenced by some environmental objects such as magnets, and thus cannot match the simulation object properly in some scenarios.

As described above, it can be known that a 6 DoF tracking solution in related art strictly limits the environmental object, influencing adaptation to the simulation object and resulting in poor user experience.

SUMMARY

Embodiments of the present disclosure provide a six degrees of freedom (6 DoF) positioning tracking device and method, and an electronic apparatus, which can solve the problems that a 6 DoF tracking solution in related art has strict limitations on an environmental object, and cannot properly match a simulation object, resulting in poor user experience.

The 6 DoF positioning tracking device provided in the embodiments of the present disclosure includes at least three tracking cameras, an inertial navigation unit and a computation processing unit. The at least three tracking cameras are distributed at preset angles and are configured to obtain image data in a current environment and transmit the image data to the computation processing unit. The inertial navigation unit is configured to obtain state information of the 6 DoF positioning tracking device in the current environment and transmit the state information to the computation processing unit. The computation processing unit is configured to determine 6 DoF data of the 6 DoF positioning tracking device relative to the current environment according to the image data and the state information.

In addition, in an exemplary technical solution, each of the at least three tracking cameras has a field of view not less than 160°, resolution not less than 640*480, and a frame rate of 30 Hz to 60 Hz. An optical lens of each of the at least three tracking cameras is transparent to a visible light band.

In addition, in an exemplary technical solution, the state information includes angular velocity information and acceleration information. The computation processing unit is configured to determine pose information of the 6 DoF positioning tracking device according to the angular velocity information and the acceleration information, and determine the 6 DoF data of the 6 DoF positioning tracking device according to the pose information and the image data.

In addition, in an exemplary technical solution, three tracking cameras are provided in the 6 DoF positioning tracking device. In a 360° physical area of the current environment, the three tracking cameras are uniformly distributed.

In addition, in an exemplary technical solution, the 6 DoF positioning tracking device further includes a battery connected to each of the at least three tracking cameras, the inertial navigation unit and the computation processing unit, where the battery is configured to provide electric energy required by running for the 6 DoF positioning tracking device.

In addition, in an exemplary technical solution, the inertial navigation unit includes a nine-axis inertial sensor, the nine-axis inertial sensor having an output frequency not less than 1000 Hz.

In another aspect, the embodiments of the present disclosure further provide a 6 DoF positioning tracking method, including: obtaining image data collected by each tracking camera in multiple tracking cameras, and extracting an image feature of the image data; matching the image features of different tracking cameras pairwise to obtain a three-dimensional feature corresponding to the image data; performing pose estimation and feature tracking on a 6 DoF positioning tracking device in a current environment based on the three-dimensional feature and state information obtained by an inertial navigation unit; and determining 6 DoF data of the 6 DoF positioning tracking device based on a result of the pose estimation and a result of the feature tracking.

In addition, in an exemplary technical solution, the 6 DoF positioning tracking method further includes: determining, based on the result of the feature tracking, whether the current environment changes, and re-performing, in a case where the current environment changes, the pose estimation and the feature tracking on the 6 DoF positioning tracking device in a new environment.

In addition, in an exemplary technical solution, the 6 DoF positioning tracking device further includes:
performing dense semantic map construction, bundle adjustment processing and repeated frame removal processing based on the 6 DoF data of the 6 DoF positioning tracking device.

Yet another aspect of the embodiments of the present disclosure provides an electronic apparatus, including the above 6 DoF positioning tracking device, where the electronic apparatus includes a virtual reality (VR) device or a mixed reality (MR) device.

By using the 6 DoF positioning tracking device and method, and the electronic apparatus, the at least three tracking cameras are configured to obtain image data in the current environment and transmit the image data to the computation processing unit; the inertial navigation unit is configured to obtain the state information of the 6 DoF positioning tracking device in the current environment and transmit the state information to the computation processing unit; and the computation processing unit is configured to determine the 6 DoF data of the 6 DoF positioning tracking device relative to the current environment according to the image data and the state information. Thus, the 6 DoF positioning tracking device needs no special sensor, and therefore does not have many use limits on a physical environment of the sensor, is small in overall size, and can more easily match some simulation objects, so as to have a good positioning tracking effect and provide a strong experience to a user.

For achieving the foregoing and related objectives, one or more aspects of the embodiments of the present disclosure include features that will be described in detail below. The following description and the accompanying drawings illustrate in detail certain illustrative aspects of the embodiments of the present disclosure. However, these aspects are indicative of only a few of the various ways in which the principles of the disclosure may be employed. Further, the present disclosure is intended to include all such aspects and their equivalents.

DETAILED DESCRIPTION OF THE EMBODIMENTS

Figure 1:
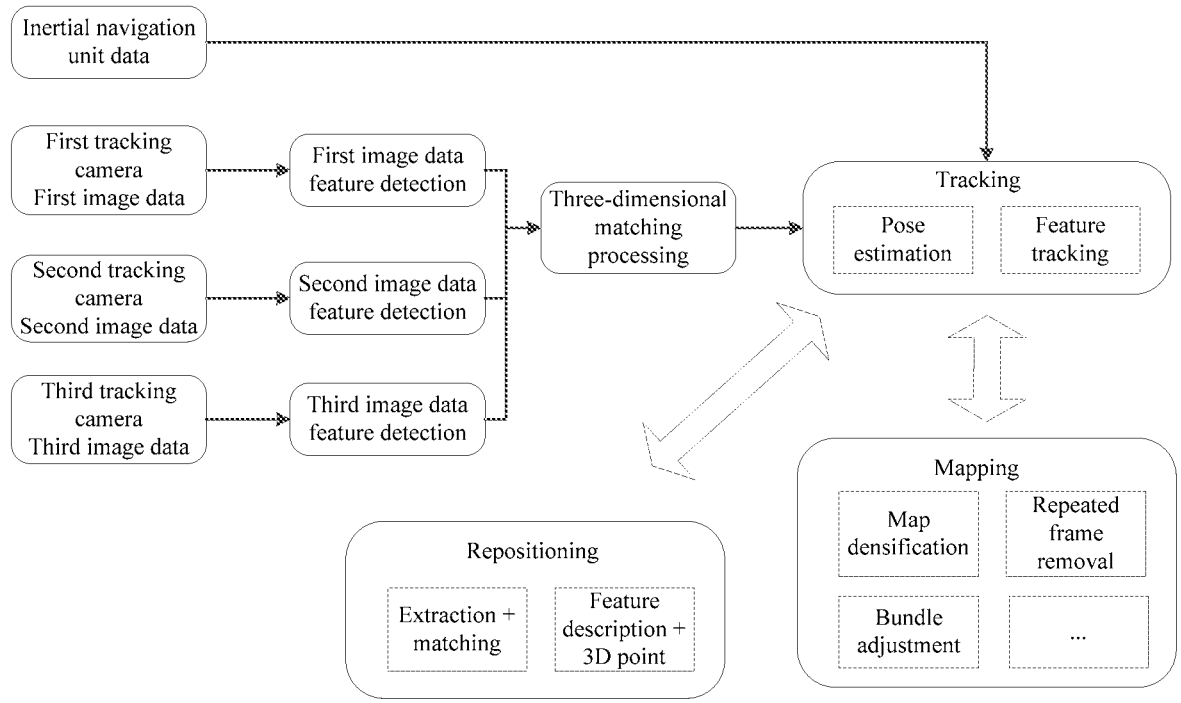
FIG. 1 is a schematic diagram of a six degrees of freedom (6 DoF) positioning tracking device according to some embodiments of the present disclosure.

In the following description, for explanation, numerous specific details are set forth in order to provide a thorough understanding of one or more embodiments. However, obviously, the embodiments may be practiced without these specific details. In other instances, well-known structures and apparatuses are shown in block diagrams in order to facilitate describing one or more embodiments.

In the description of the embodiments of the present disclosure, it is to be understood that the terms "central", "longitudinal", "transverse", "length", "width", "thickness", "upper", "lower", "front", "back", "left", "right", "vertical", "horizontal", "top", "bottom", "inner", "outer", "clockwise", "counterclockwise", "axial", "radial", "circumferential", etc. indicate azimuthal or positional relations based on those shown in the drawings only for ease of description of the embodiments of the present disclosure and for simplicity of description, and are not intended to indicate or imply that the referenced device or element must have a particular orientation and be constructed and operative in a particular orientation, and thus should not be construed as a limitation on the present disclosure.

To describe the six degrees of freedom (6 DoF) positioning tracking device and method in the embodiments of the present disclosure in detail, exemplary embodiments of the present disclosure will be described in detail in conjunction with the accompanying drawings.

FIG. 1 illustrates a schematic principle of the 6 DoF positioning tracking device according to some embodiments of the present disclosure.

As shown in FIG. 1, the 6 DoF positioning tracking device in the embodiment the present disclosure includes at least three tracking cameras, an inertial navigation unit and an computation processing unit. The at least three tracking cameras are distributed at preset angles and are configured to obtain image data in a current environment and transmit the image data to the computation processing unit. The inertial navigation unit is configured to obtain state information of the 6 DoF positioning tracking device in the current environment and transmit the state information to the computation processing unit. The computation processing unit is configured to determine 6 DoF data of the 6 DoF positioning tracking device relative to the current environment according to the obtained image data and the obtained state information.

In the 6 DoF positioning tracking device in the embodiments of the present disclosure, parameters of each of the at least three tracking cameras may be configured as follows: each of the at least three tracking cameras has a field of view not less than 160°, resolution not less than 640*480, and a frame rate of 30 Hz to 60 Hz. In addition, an optical lens of each of the at least three tracking cameras is transparent to a visible light band. In a specific application process, the parameters can be flexibly adjusted according to requirements or demands of users, and are not limited to the above specific numerical values.

Figure 3:
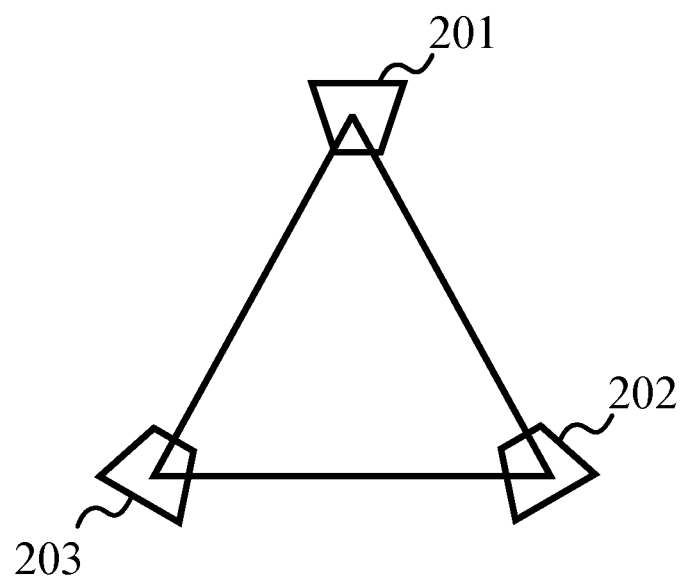
FIG. 3 is a schematic diagram of distribution of tracking cameras of a 6DoF positioning tracking device according to some embodiments of the present disclosure.

In order to ensure that each of the at least three tracking cameras can completely collect image data of the current environment and the number of the tracking cameras can be reduced as much as possible, in one exemplary implementation of the embodiments of the present disclosure, three tracking cameras (201, 202, and 203) are provided in the 6 DoF positioning tracking device, and the three tracking cameras (201, 202, and 203) are uniformly distributed in a 360° physical area of the current environment, like three vertexes of a triangle, as shown in FIG. 3.

In addition, a high-precision inertial navigation unit may be provided in the 6 DoF positioning tracking device. The inertial navigation unit may be a nine-axis inertial sensor, which is ensured to have an output frequency not less than 1000 Hz. The inertial navigation unit can obtain angular velocity information and acceleration information of the 6 DoF positioning tracking device in the current environment in real time, so that the computation processing unit can obtain pose information of the 6 DoF positioning tracking device in the current environment based on the angular velocity information and the acceleration information.

It may be known from the above description that the state information includes angular velocity information and acceleration information of the 6 DoF positioning tracking device, and the computation processing unit can obtain the pose information of the 6 DoF positioning tracking device in the current environment based on the angular velocity information and the acceleration information and further determine the 6 DoF data of the 6 DoF positioning tracking device according to the pose information and the image data.

Herein, inertial navigation mainly refers to a technique in which instantaneous speed and instantaneous position data of a device can be obtained by measuring acceleration of the corresponding device and automatically performing an integral operation. The inertial navigation unit in the embodiments of the present disclosure may also adopt other sensor structures with an inertial navigation function.

For simplifying use of the 6 DoF positioning tracking device, a battery with a certain capacity may be arranged in the 6 DoF positioning tracking device, and the battery is connected to each of the at least three tracking cameras, the inertial navigation unit and the computation processing unit to provide electric energy required by running for the 6 DoF positioning tracking device. The provision of a built-in battery can omit the circuit connection between the 6 DoF positioning tracking device and a simulation object, so as to simplify the use operation.

In addition, a small fan with a certain heat dissipation capacity may be arranged in the 6 DoF positioning tracking device, so as to ensure temperature stability of the 6 DoF positioning tracking device in a long-term running process, and prevent an adverse effect of high temperature on the performance of each structural component.

In one exemplary implementation of the present disclosure, an example is shown in which three tracking cameras are provided. First image data is obtained by the first tracking camera, second image data is obtained by the second tracking camera, and third image data is obtained by the third tracking camera. Then, the first image data, the second image data and the third image data are subject to feature detection to obtain corresponding image features. After that, three-dimensional matching processing is carried out on the three different image features, and in the three-dimensional matching process, the features are matched pairwise and then corresponding three-dimensional features are obtained and sent to a tracking module. The tracking module performs pose estimation and feature tracking on a 6 DoF positioning tracking device according to the three-dimensional features and data collected by an inertial navigation unit. The pose estimation is configured to obtain pose information of the 6 DoF positioning tracking device. The feature tracking is configured to perform tracking between adjacent frames of image data.

In addition, the 6 DoF positioning tracking device further includes a mapping module and a repositioning module which are connected to the tracking module. The repositioning module is mainly used for determining whether the current environment changes based on a result of feature tracking, and in a case where the current environment changes due to movement of the 6 DoF positioning tracking device, the repositioning module re-performs feature extraction (feature detection) and three-dimensional matching on the 6 DoF positioning tracking device, and determines feature description and corresponding 3D point information in the new environment. In addition, the mapping module is mainly used for further performing operations, such as dense semantic map construction (map densification), bundle adjustment processing, repeated frame removal processing or the like, according to the results of feature tracking and pose estimation. These operations are not enumerated, and related functions may be achieved according to specific application environments and requirements.

Figure 2:
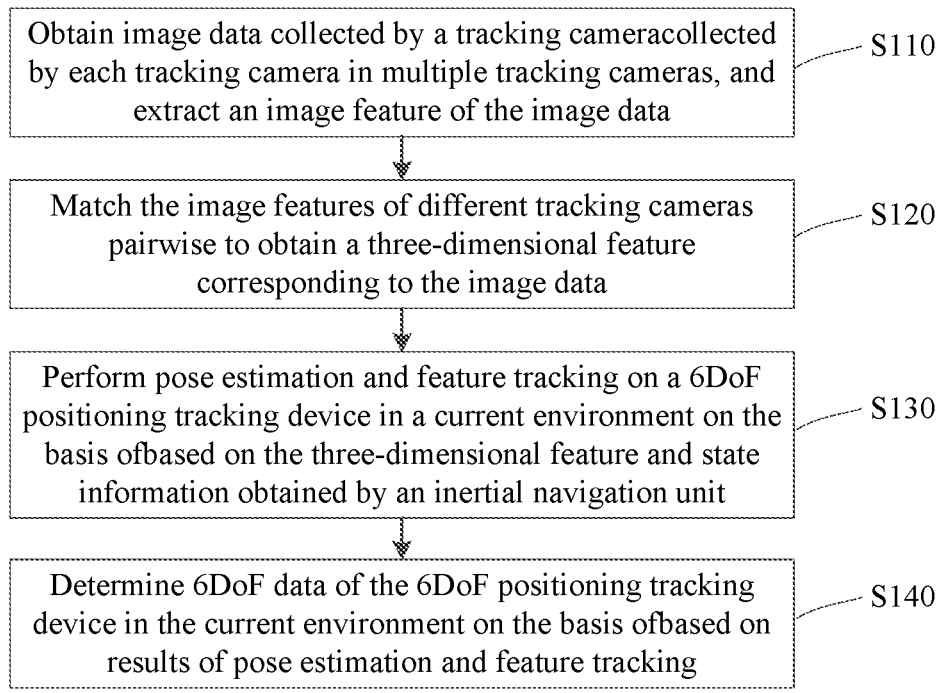
FIG. 2 is a flowchart of a 6 DoF positioning tracking method according to some embodiments of the present disclosure.

Corresponding to the above 6 DoF positioning tracking device, the embodiments of the present disclosure further provide a 6 DoF positioning tracking method. FIG. 2 shows a flow of the 6 DoF positioning tracking method according to some embodiments of the present disclosure.

As shown in FIG. 2, the 6 DoF positioning tracking method according to the embodiments of the present disclosure includes operations S110 to S140 which are described in detail as follows.

At S110, image data collected by each tracking camera in multiple tracking cameras is obtained, and an image feature of the image data is extracted.

At S120, the image features of different tracking cameras are matched pairwise to obtain a three-dimensional feature corresponding to the image data.

At S130, pose estimation and feature tracking are performed on a 6 DoF positioning tracking device in a current environment based on the three-dimensional feature and state information obtained by an inertial navigation unit.

At S140, 6 DoF data of the 6 DoF positioning tracking device in the current environment is determined based on a result of the pose estimation and a result of the feature tracking.

In addition, the 6 DoF positioning tracking method in the embodiments of the present disclosure further includes: it is determined, based on the result of the feature tracking, whether the current environment changes, and in a case where the current environment changes, the pose estimation and the feature tracking are re-performed on the 6 DoF positioning tracking device in a new environment.

In some embodiments of the present disclosure, dense semantic map construction, bundle adjustment processing, repeated frame removal processing, etc. which are not enumerated, may also be performed based on the 6 DoF data of the 6 DoF positioning tracking device, and the related functions can be achieved according to specific application environments and requirements.

Yet another aspect of the embodiments of the present disclosure further provides an electronic apparatus, including the above 6 DoF positioning tracking device. The electronic apparatus includes a virtual reality (VR) device or a mixed reality (MR) device.

It should be noted that the above embodiments of the 6 DoF positioning tracking method and the electronic apparatus are described with reference to the description of the embodiment of the 6 DoF positioning tracking device and are not enumerated here.

According to the 6 DoF positioning tracking device and method, and the electronic apparatus, each of the at least three tracking cameras obtains image data in a current environment, the inertial navigation unit obtains state information of the 6 DoF positioning tracking device in the current environment, and the computation processing unit is configured to determine 6 DoF data of the 6 DoF positioning tracking device relative to the current environment according to the image data and the state information. Thus, the 6 DoF positioning tracking device needs no special sensor, has a smaller entire size, avoids use limits of a sensor on a physical environment, more easily matches a simulation object, and is directly supplied with power by a battery without the need of setting a connecting circuit, so as to have a good positioning tracking effect and provide a strong experience to a user.

The 6 DoF positioning tracking device and method, and the electronic apparatus according to the embodiments of the present disclosure are described above by way of example with reference to the accompanying drawings. However, it will be appreciated by those having ordinary skill in the art that various improvements may be made to the 6 DoF positioning tracking device and method, and the electronic apparatus set forth in the embodiments of the present disclosure described above without departing from the present disclosure. Thus, the scope of protection the present disclosure shall be defined by the appended claims.

The embodiments of the present disclosure further provide a computer-readable storage medium, storing a computer program, where the computer program is configured to execute the operations of any one of the above mentioned method embodiments at runtime.

In an exemplary embodiment, the computer-readable storage medium mentioned above may include, but is not limited to, a universal serial bus flash disk, a read-only memory (ROM), a random access memory (RAM), a removable hard disk, a magnetic disk, an optical disk, or various media that can be used for storing the computer program.

The embodiments of the present disclosure further provide an electronic device, including a memory and a processor, wherein the memory has a computer program stored therein, and the processor is configured to run the computer program to execute the operations of any one of the above mentioned method embodiments.

In one exemplary embodiment, the electronic device may further includes a transmission apparatus and an input/output apparatus, where the transmission apparatus is connected to the processor described above and the input/output apparatus is connected to the processor described above.

Specific examples in the embodiments may be referred to the examples described in the above-described embodiments and illustrative implementations, which are not described in detail herein.

Obviously, those having ordinary skill in the art will appreciate that the modules or operations in the embodiments of the present disclosure mentioned above may be achieved with a general-purpose computation device, and may be centralized on a single computation device or distributed on a network composed of a plurality of computation devices. They may be achieved with program codes executable by the computation device, such that they may be stored in a storage device to be executed by the computation device. Under some conditions, the operations shown or described may be executed in an order different from that herein, or they may be fabricated separately as individual integrated circuit modules, or multiple modules or operations of them may be fabricated as a single integrated circuit module for implementation. Thus, the present disclosure is not limited to any particular combination of hardware and software.

The foregoing is merely the exemplary embodiments of the present disclosure and is not set to limit the present disclosure, and various changes and modifications may be made by those having ordinary skill in the art. Any modifications, equivalent substitutions, improvements, and the like within the principles of the present disclosure are intended to be included within the scope of protection of the present disclosure.

INDUSTRIAL APPLICABILITY

As mentioned above, the 6 DoF positioning tracking device provided in the embodiments of the present disclosure needs no special sensor, and therefore does not have many use limits on a physical environment of the sensor, is small in overall size, and can more easily match some simulation objects, so as to have a good positioning tracking effect and provide a strong experience to a user.

What is claimed is:

1. A six degrees of freedom (6DoF) positioning tracking device, comprising first, second and third tracking cameras, an inertial navigation unit and a computation processing unit, wherein
the first, second and third tracking cameras are uniformly distributed at three vertexes of a triangle and at preset angles in a 360° physical area of a current environment, and are configured to obtain complete image data of the current environment and transmit the image data to the computation processing unit;
the inertial navigation unit is configured to obtain state information of the 6DoF positioning tracking device in the current environment and transmit the state information to the computation processing unit; and
the computation processing unit is configured to determine 6DoF data of the 6DoF positioning tracking device relative to the current environment according to the image data and the state information.

2. The 6DoF positioning tracking device according to claim 1, wherein
each of the first, second and third tracking cameras has a field of view not less than 160°, resolution not less than 640 * 480, and a frame rate of 30 Hz to 60 Hz; and
an optical lens of each of the first, second and third tracking cameras is transparent to a visible light band.

3. An electronic apparatus, comprising the six degrees of freedom (6DoF) positioning tracking device according to claim 2, wherein the electronic apparatus comprises a virtual reality (VR) device or a mixed reality (MR) device.

4. The 6DoF positioning tracking device according to claim 1, wherein the state information comprises angular velocity information and acceleration information; and
the computation processing unit is configured to determine pose information of the 6DoF positioning tracking device according to the angular velocity information and the acceleration information, and determine the 6DoF data of the 6DoF positioning tracking device according to the pose information and the image data.

5. An electronic apparatus, comprising the six degrees of freedom (6DoF) positioning tracking device according to claim 3, wherein the electronic apparatus comprises a virtual reality (VR) device or a mixed reality (MR) device.

6. The 6DoF positioning tracking device according to claim 1, further comprising:
a battery connected to each of the first, second and third tracking cameras, the inertial navigation unit and the computation processing unit, wherein the battery is configured to provide electric energy required by running for the 6DoF positioning tracking device.

7. The 6DoF positioning tracking device according to claim 1, wherein
the inertial navigation unit comprises a nine-axis inertial sensor,
wherein the nine-axis inertial sensor has an output frequency not less than 1000 Hz.

8. An electronic apparatus, comprising the six degrees of freedom (6DoF) positioning tracking device according to claim 1, wherein the electronic apparatus comprises a virtual reality (VR) device or a mixed reality (MR) device.

9. A six degrees of freedom (6DoF) positioning tracking method, comprising:
obtaining complete image data of a current environment collected by each of first, second and third tracking cameras uniformly distributed at three vertexes of a triangle and at preset angles in a 360° physical area of the current environment, and extracting an image feature of the image data;

matching the image features of different tracking cameras pairwise to obtain a three-dimensional feature corresponding to the image data;

performing pose estimation and feature tracking on a 6DoF positioning tracking device in the current environment based on the three-dimensional feature and state information obtained by an inertial navigation unit; and determining 6DoF data of the 6DoF positioning tracking device based on a result of the pose estimation and a result of the feature tracking.

10. The 6DoF positioning tracking method according to claim 9, further comprising:

determining, based on the result of the feature tracking, whether the current environment changes, and re-performing, in a case where the current environment changes, the pose estimation and the feature tracking on the 6DoF positioning tracking device in a new environment.

11. A non-transitory computer-readable storage medium, storing a computer program, wherein the computer program implements the method according to claim 9 when executed by a processor.

12. An electronic device, comprising a memory and a processor, wherein the memory stores a computer program, and the processor is configured to run the computer program to execute the method according to claim 10.

13. A non-transitory computer-readable storage medium, storing a computer program, wherein the computer program implements the method according to claim 10 when executed by a processor.

14. The 6DoF positioning tracking method according to claim 9, further comprising:

performing dense semantic map construction, bundle adjustment processing and repeated frame removal processing based on the 6DoF data of the 6DoF positioning tracking device.

15. A non-transitory computer-readable storage medium, storing a computer program, wherein the computer program implements the method according to claim 14 when executed by a processor.

16. The 6DoF positioning tracking method according to claim 9, wherein the state information comprises angular velocity information and acceleration information; and performing pose estimation on a 6DoF positioning tracking device in a current environment based on state information obtained by an inertial navigation unit comprises:

determining pose information of the 6DoF positioning tracking device according to the angular velocity information and the acceleration information.

17. The 6DoF positioning tracking method according to claim 16, wherein determining 6DoF data of the 6DoF positioning tracking device based on a result of the pose estimation and a result of the feature tracking comprises:

determining the 6DoF data of the 6DoF positioning tracking device according to the pose information and the image data.

18. A non-transitory computer-readable storage medium, storing a computer program, wherein the computer program implements the method according to claim 17 when executed by a processor.

19. A non-transitory computer-readable storage medium, storing a computer program, wherein the computer program implements the method according to claim 16 when executed by a processor.

* * * * *